Jan. 27, 1953        R. J. GAUBERT        2,626,495
BAG SEALING MACHINE
Filed April 25, 1949                                12 Sheets-Sheet 11
FIG_30_
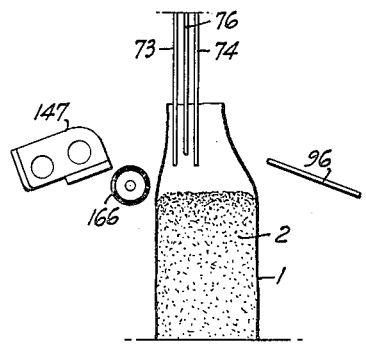
FIG_33
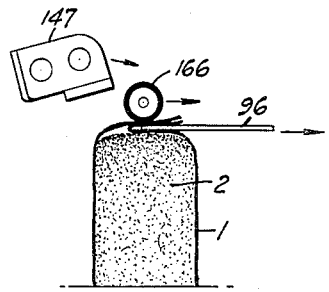
FIG_31
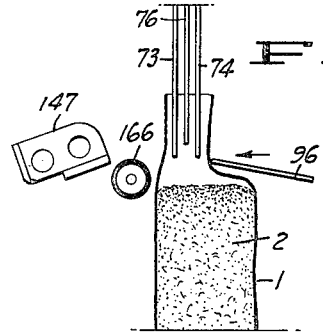
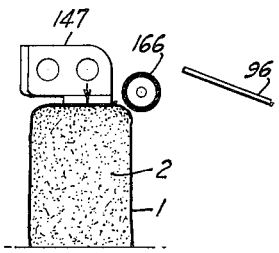
FIG_34
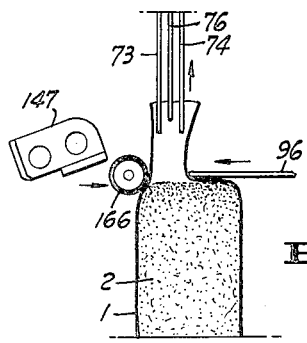
FIG_32_
INVENTOR
Rene J. Gaubert
BY
*Fisher & Swain*
ATTORNEYS Jan. 27, 1953 — R. J. GAUBERT — 2,626,495
BAG SEALING MACHINE
Filed April 25, 1949 — 12 Sheets-Sheet 12
FIG_35_
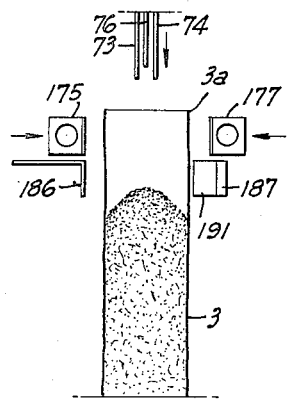
FIG_37_
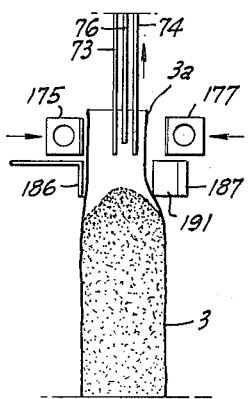
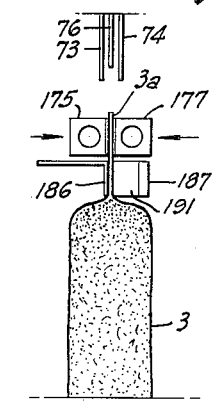
FIG_36_
FIG_38_
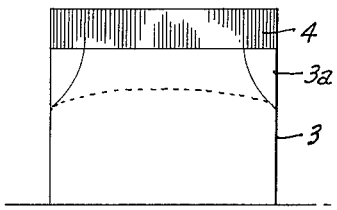
FIG_39_
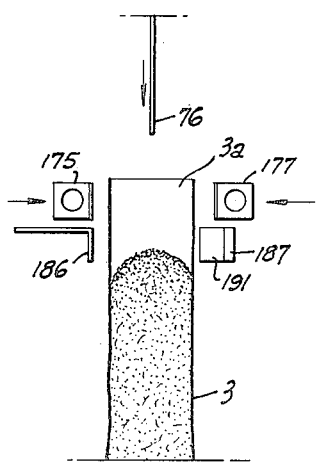
FIG_40_
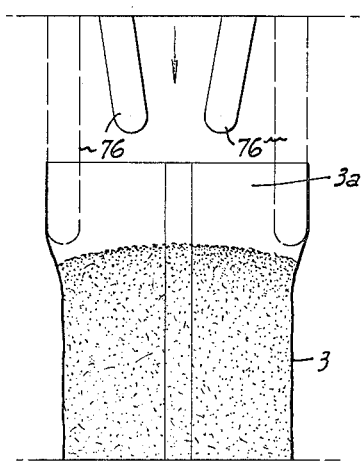
INVENTOR
Rene J. Gaubert
BY
ATTORNEYS Patented Jan. 27, 1953

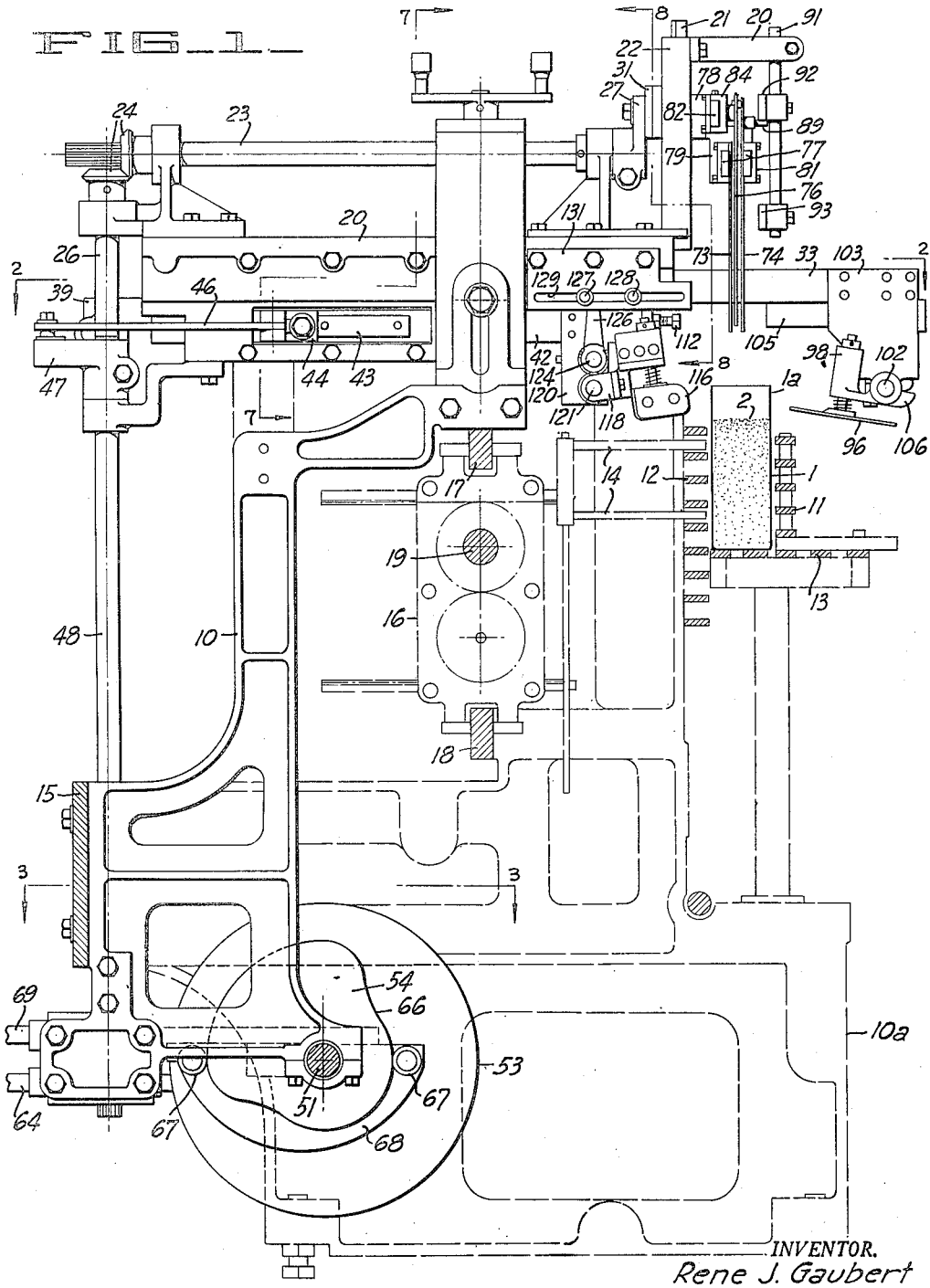

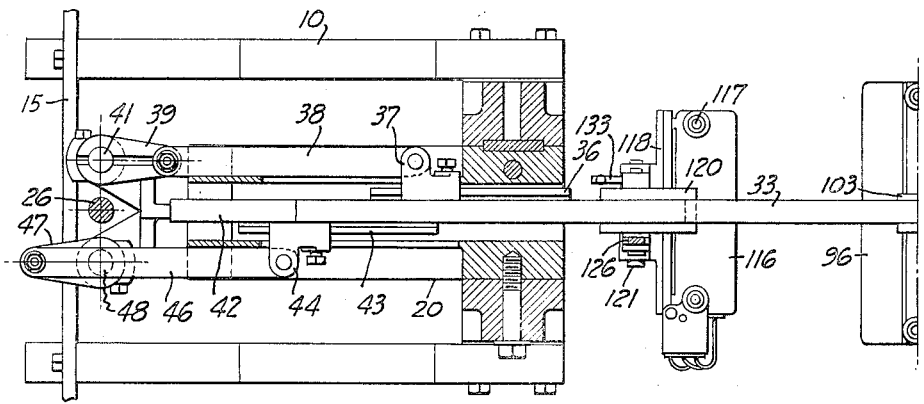
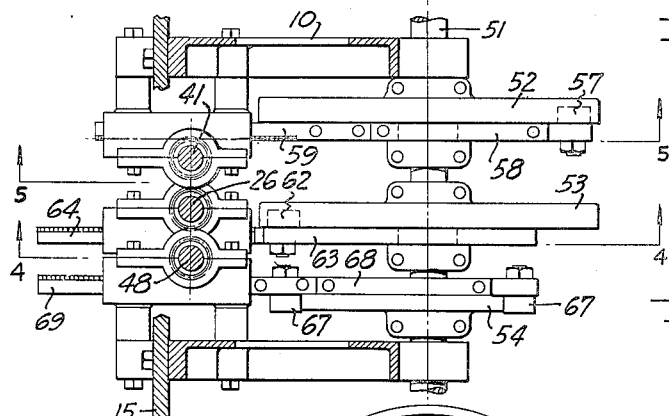
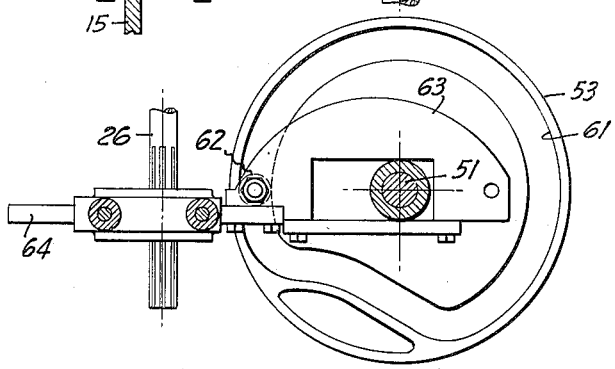
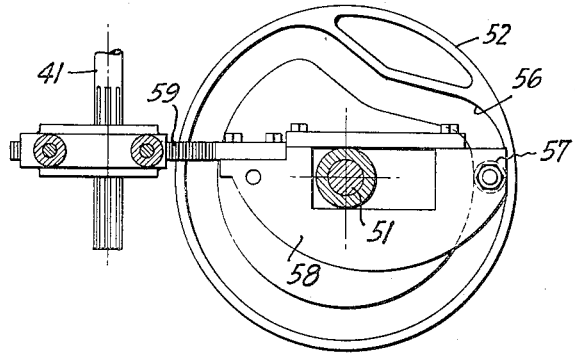

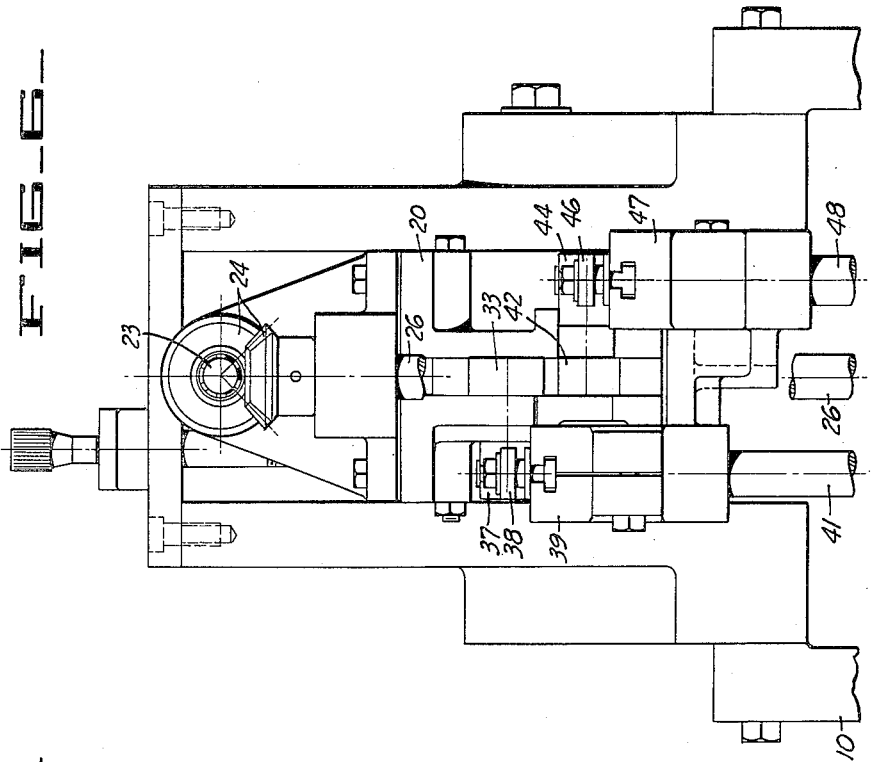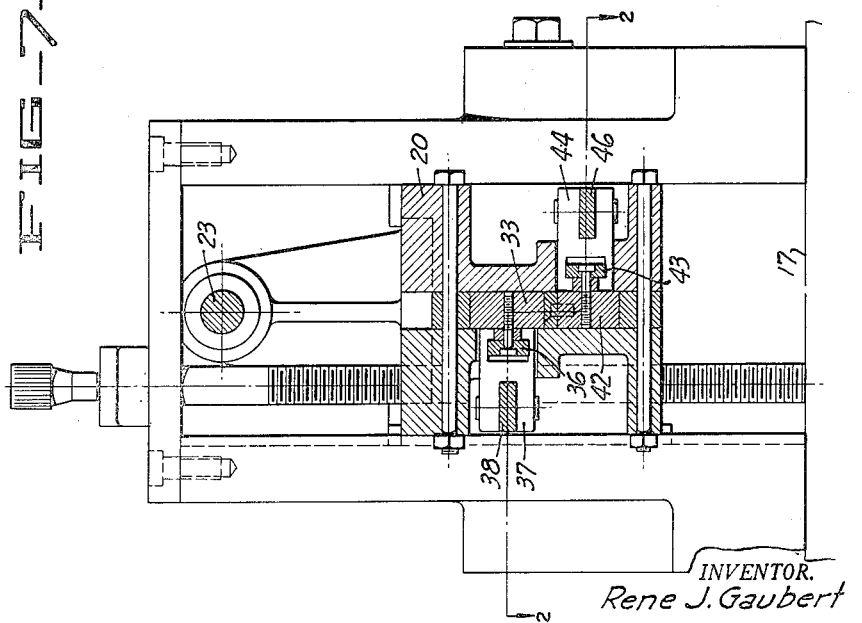

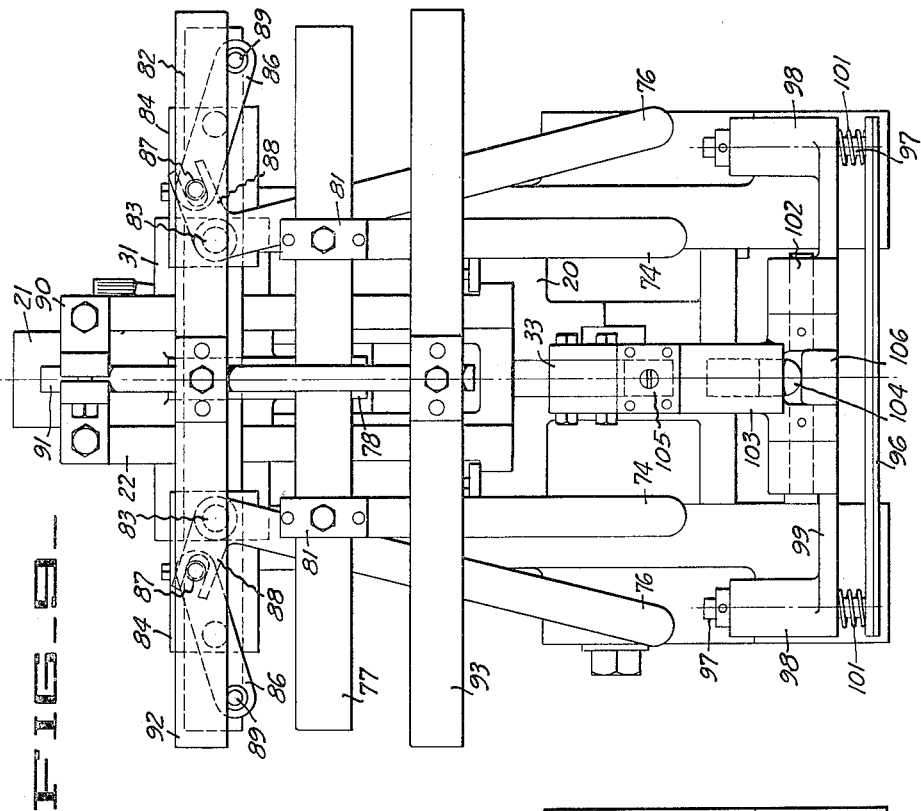

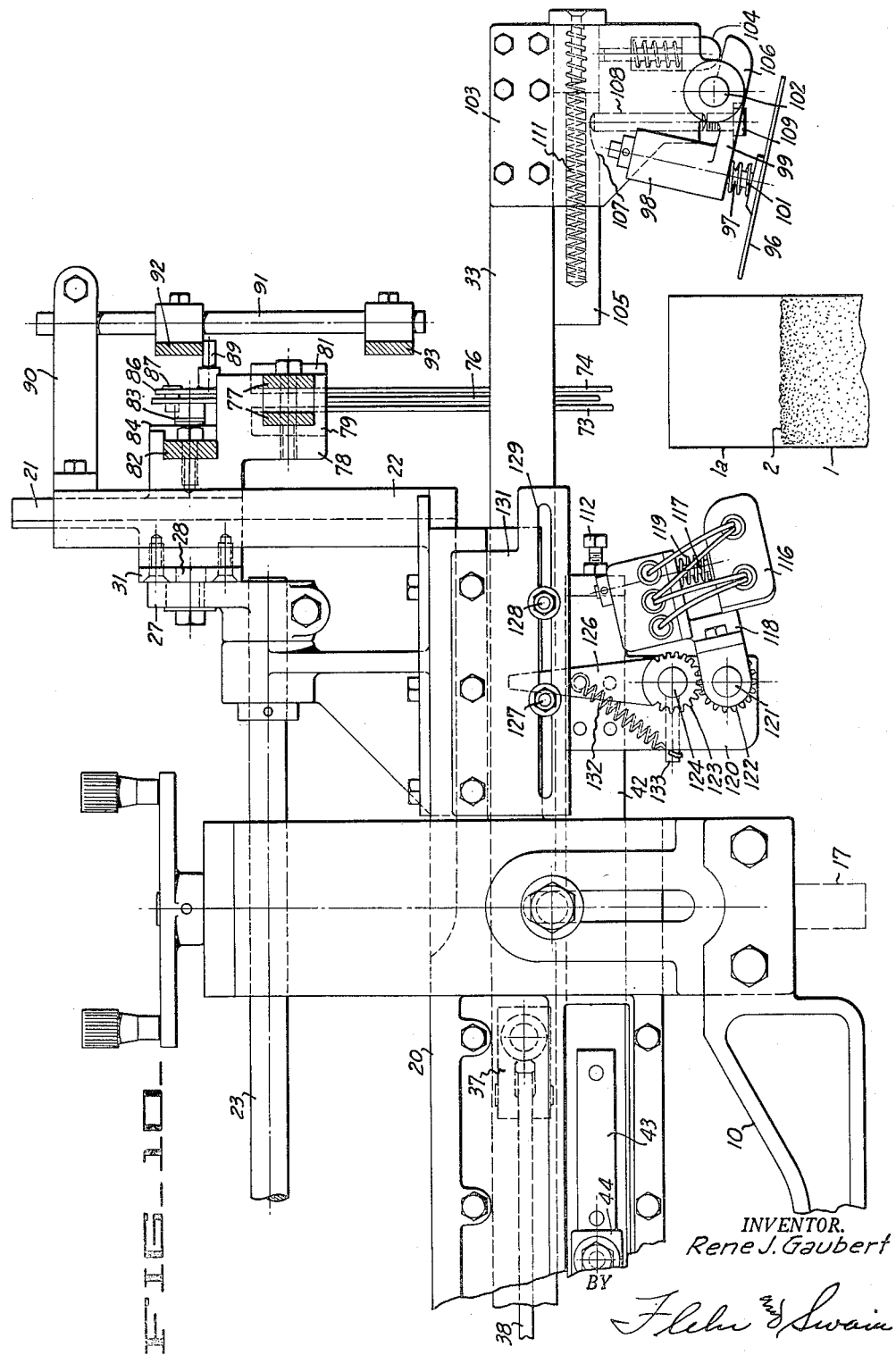

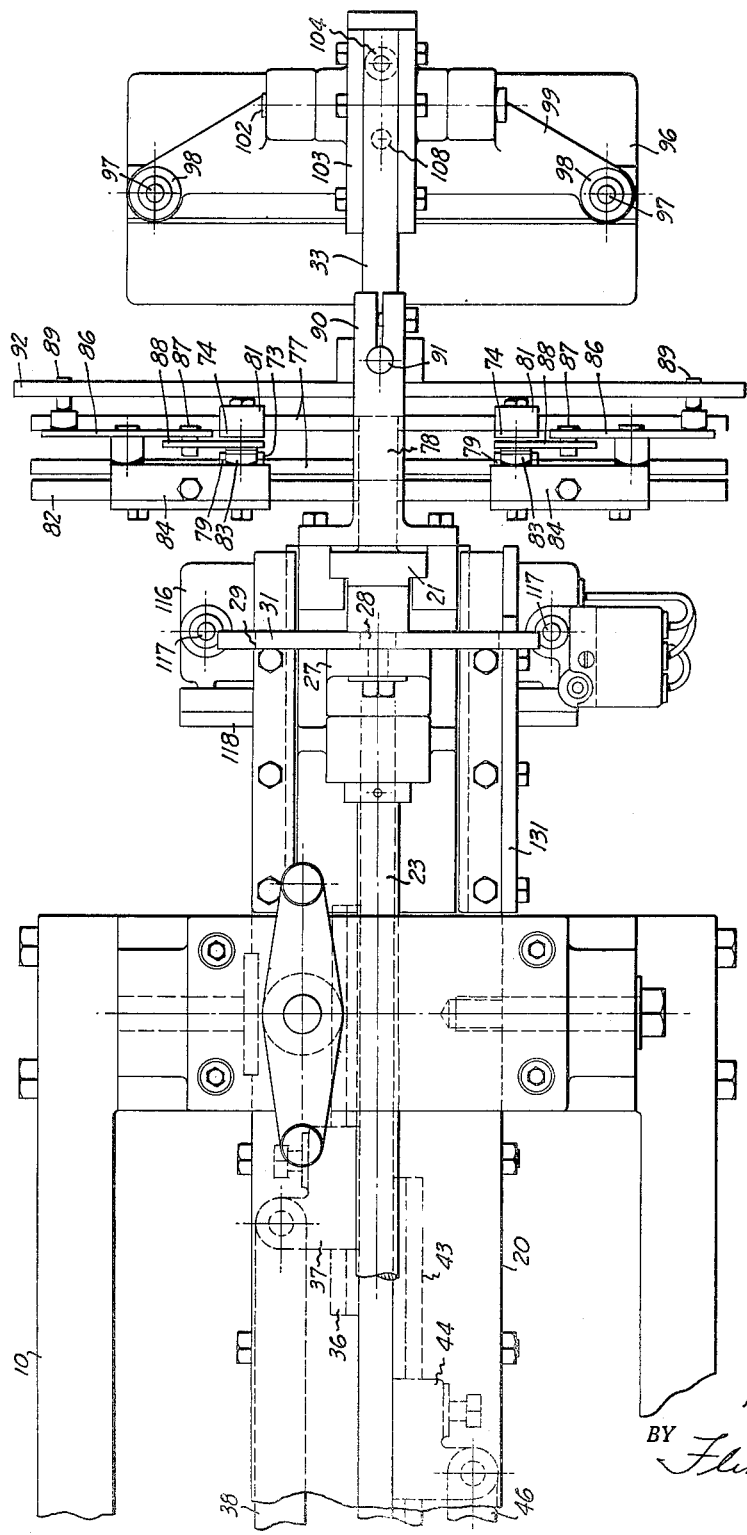

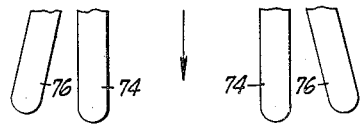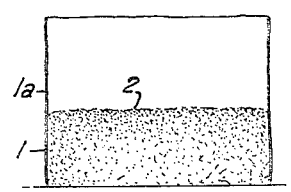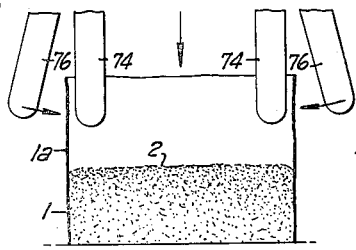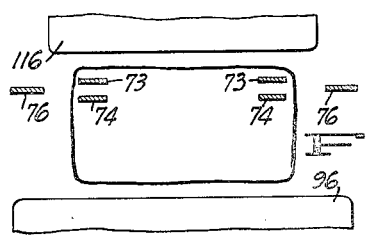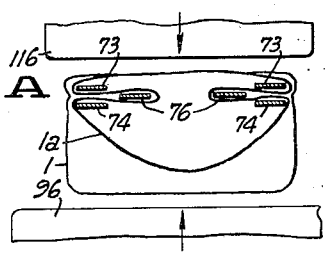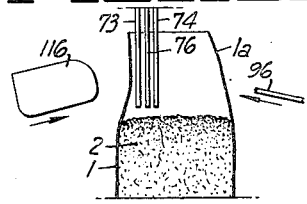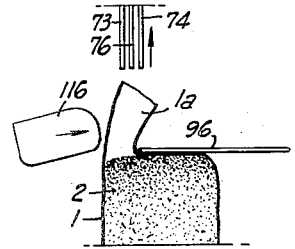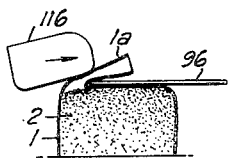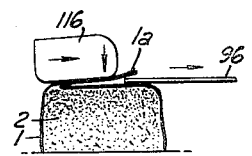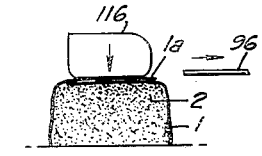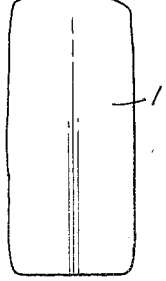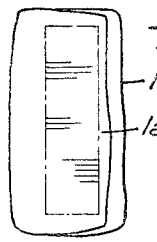
INVENTOR.
Rene J. Gaubert
BY Flehr & Swain
ATTORNEYS

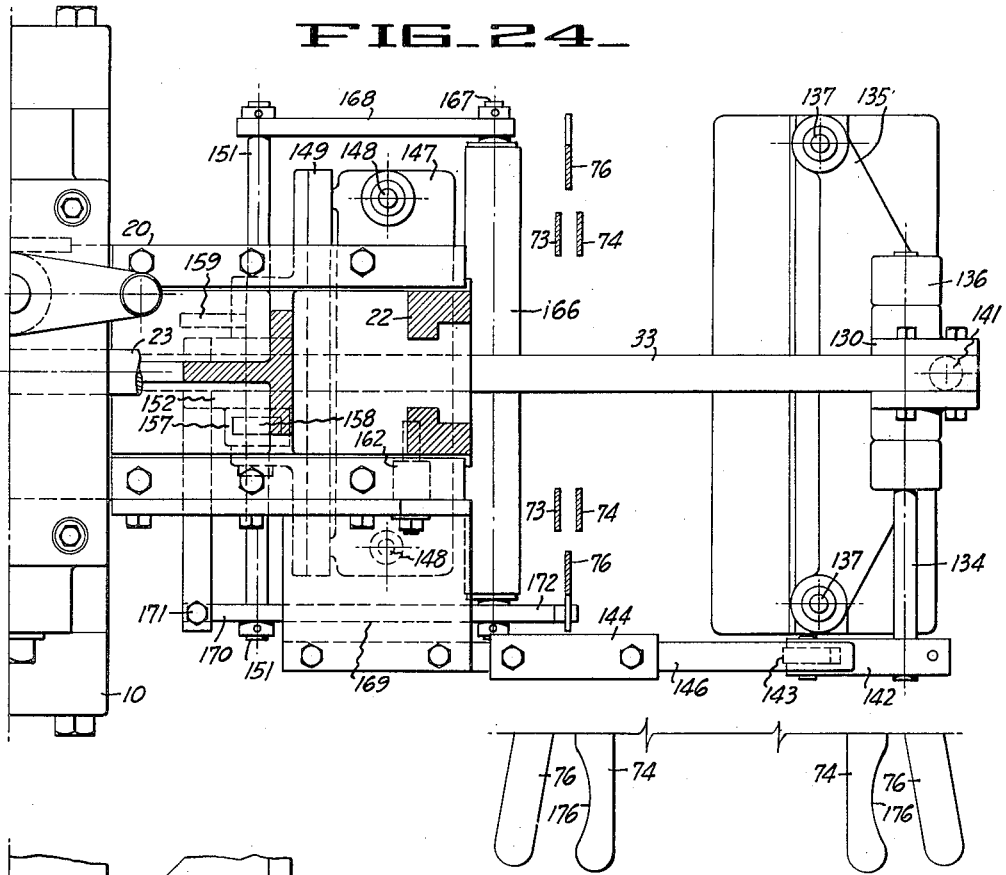
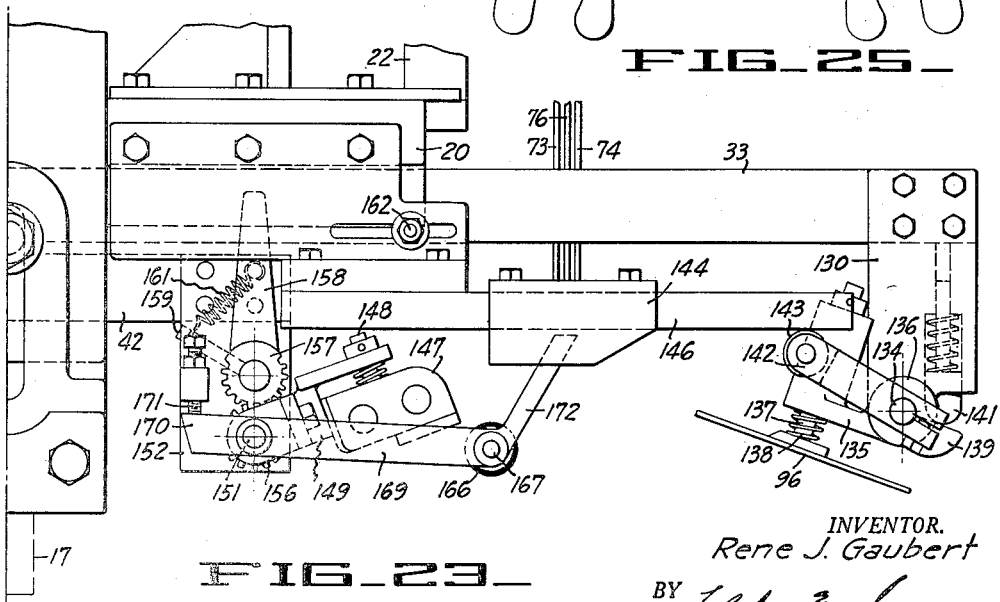

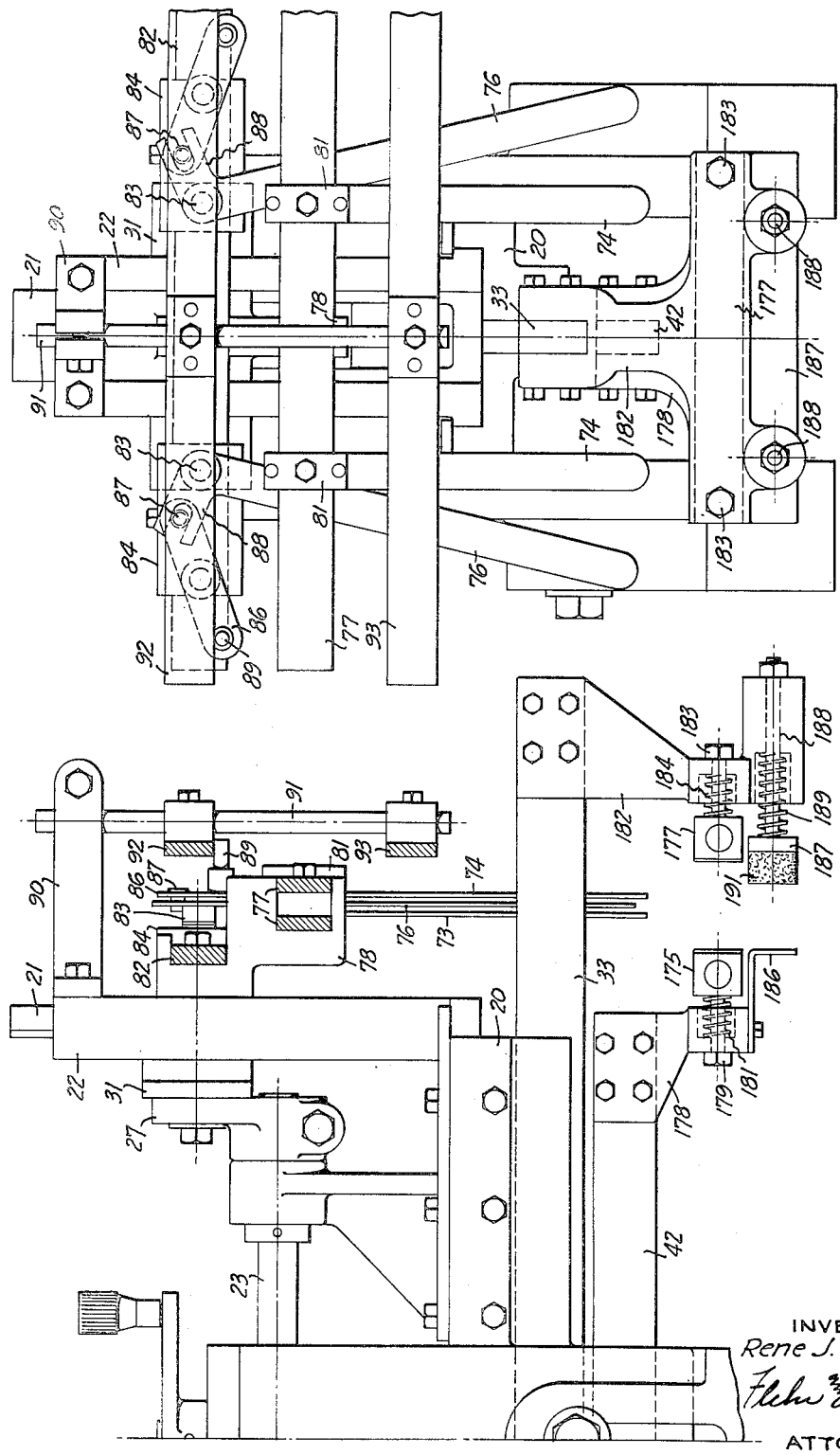

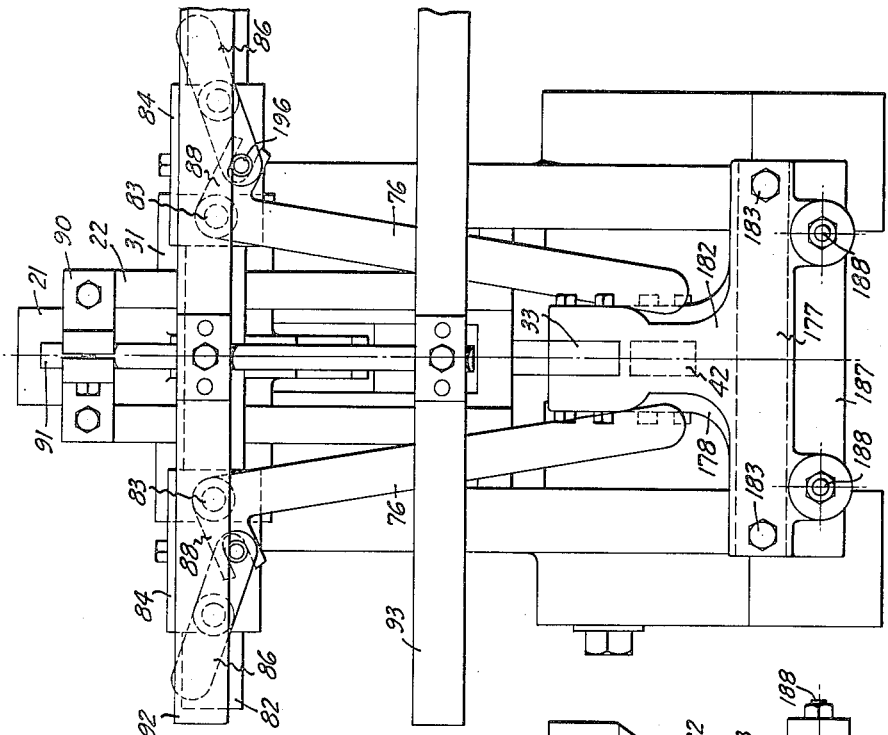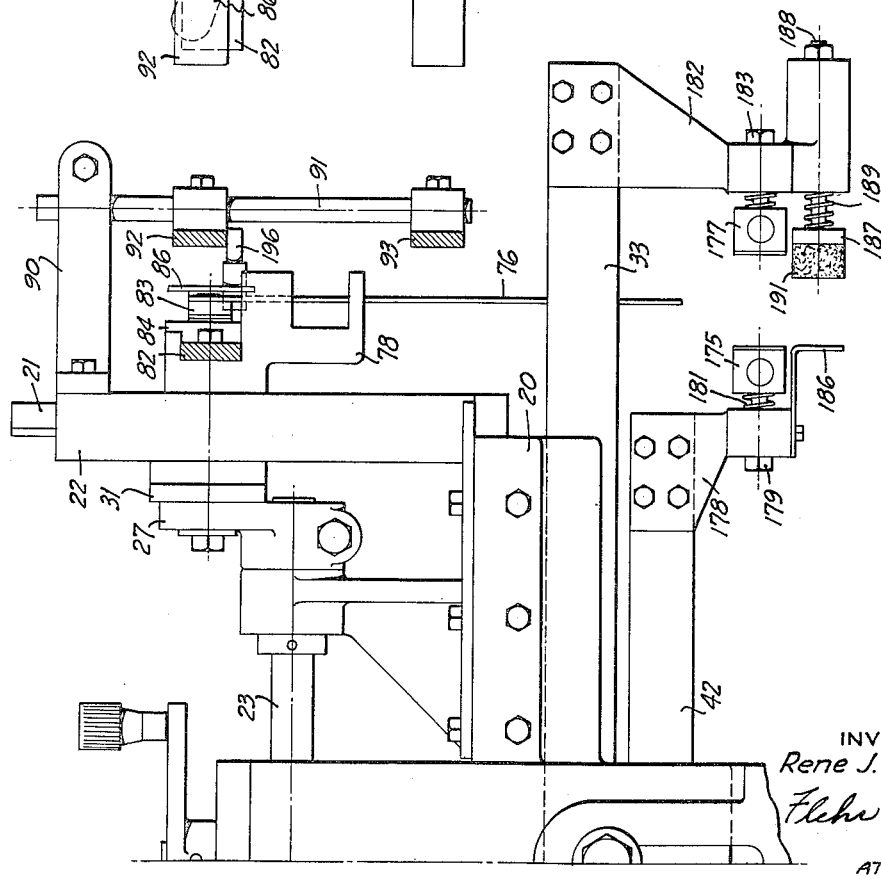

2,626,495

UNITED STATES PATENT OFFICE 2,626,495

BAG SEALING MACHINE

Rene J. Gaubert, Oakland, Calif., assignor to Simplex Packaging Machinery, Inc., a corporation of California Application April 25, 1949, Serial No. 89,445

7 Claims. (Cl. 53—149)

This invention relates generally to machines for automatically closing and sealing bags after a bag filling operation. It is particularly applicable to the sealing of bags made of material like moistureproof cellophane or Pliofilm, which can be best sealed.

It is an object of the invention to provide a machine of the above character which will carry out its functions automatically, and which in particular is suitable for use with an automatic filling machine.

It is a further object of the invention to provide a machine of the above character which is capable of being adjusted to operate upon bags of various sizes.

Another object of the invention is to provide a machine which will afford a relatively tight closure and seal for the upper end of the bag, thereby avoiding undue looseness of the contents.

Another object of the invention is to provide a seal for a filled bag which would not leave objectionable tabs.

Additional objects of the invention will appear from the following description in which the preferred embodiments have been set forth in detail in conjunction with the accompanying drawing.

Referring to the drawing:

Figure 1 is a side elevational view, partly in section, illustrating a machine incorporating the present invention.

Figure 2 is a cross-sectional detail taken along the line 2—2 of Figure 1.

Figure 3 is a cross-sectional detail taken along the line 3—3 of Figure 1.

Figure 4 is a cross-sectional detail taken along the line 4—4 of Figure 3.

Figure 5 is a cross-sectional detail taken along the line 5—5 of Figure 3.

Figure 6 is a detail illustrating the upper portion of the machine, as the machine is viewed from the left of Figure 1.

Figure 7 is a cross-sectional detail taken along the line 7—7 of Figure 1.

Figure 8 is a cross-sectional detail on an enlarged scale, taken along the line 8—8 of Figure 1.

Figure 9 is an enlarged detail of the upper portion of the machine, as viewed from the right in Figure 1.

Figure 10 is an enlarged detail showing the upper right-hand portion of the machine as viewed in Figure 1.

Figure 11 is a plan view of the parts as illustrated in Figure 10.

Figures 12, 12a, 13, 14, 14a, 15 to 20 inclusive are schematic views illustrating various phases in the operation of the machine, and serving to facilitate description of a complete closing and heat sealing cycle.

Figures 21 and 22 are side elevational and top plan views respectively of a closed and sealed bag after being operated upon by the present machine.

Figure 23 is a side elevational view of the head of the machine, illustrating a modification of the invention in which roller means is utilized to aid in the folding and sealing operations.

Figure 24 is a plan view of the machine as illustrated in Figure 23, with certain parts in section.

Figure 25 is a detail illustrating the lower ends of the fingers utilized with the machine of Figures 23 and 24.

Figure 26 is a view similar to view 23, but illustrating another embodiment of the invention suitable for application of a crimp seal, and where the bag is of the gusset type.

Figure 27 is an end view of the machine as illustrated in Figure 26.

Figure 28 is a view similar to Figure 23, but showing another embodiment of the invention suitable for application of a crimp seal to a flat plain type of bag.

Figure 29 is an end view of the machine as illustrated in Figure 28.

Figures 30 to 34 inclusive are diagrammatic views illustrating operation of that embodiment of the invention illustrated in Figures 23 to 25 inclusive.

Figures 35 to 38 inclusive are diagrammatic views serving to illustrate operation of that embodiment of the invention illustrated in Figures 26 and 27.

Figures 39 and 40 are diagrammatic views serving to illustrate the embodiment of the invention shown in Figures 28 and 29.

The present machine is suitable for use with the automatic bag making and filling machine illustrated in my copending application Serial No. 55,395, filed October 19, 1948. The machine of said application includes a bag making unit which forms bags of a web of moistureproof cellophane, Pliofilm, or like material which can be sealed by application of heat. The bags as successively formed by the bag making unit are delivered to conveying means which serves to intermittently advance the bags step by step to a bag filling unit, where the bags are filled with a measured or weighed amount of a product. From the bag filling unit the filled bags are then prgressively moved to the automatic sealing machine described herein. Between the bag filling and sealing stations, there may be one or more additional stations, such as a shaking station, etc.

The present sealing machine performs folding operations upon the end portion of the bag which extends above the product, after which the folded parts are heat sealed together. In a preferred embodiment of the invention the sealing operation is carried out in such a manner that there is no undue looseness of the contents of the bag after the sealing operation, and no objectionable projecting tab remains.

In general the machine consists of a frame 10 (Figure 1) which may be adapted for attachment to the frame 10a (illustrated in dot-dash lines in Figure 1) of the bag filling machine of the above mentioned copending application, through connecting parts hereinafter mentioned. Additional parts of the bag filling machine illustrated in Figure 1 include the forward and rear horizontal bars 11 and 12 which form guides between which the bags progress, together with the bars 13 which form a support for the bags. Sets of conveying fingers 14 are carried by the operating units 16. The upper and lower ends of the units 16 are carried by the horizontal guide rails 17 and 18, whereby each unit 16 together with the fingers 14 can be oscillated horizontally. A driven shaft 19 connects with all of the units 16, and when in operation shaft 19 is oscillated and reciprocated by cam means to effect cyclic advancement and retraction of the fingers 14, with synchronized reciprocation between conveying stations. Bar 17 together with attaching plate 15 serves to secure frame 10 to the frame 10a of the bag filling machine.

As explained in the aforementioned copending application, the various sets of conveying fingers 14 are positioned at predetermined intervals apart, and they perform the function of advancing the bags step by step. Briefly at one point in the cycle of operation of the conveying means, all of the sets of fingers 14 are retracted as illustrated in Figure 1. As the conveying cycle proceeds, all of the fingers are advanced by virtue of gear and rack means which is actuated in conjunction with rotation of shaft 19. When the fingers are fully advanced into bag engaging positions, all of the units 16 are moved longitudinally of the guide rails 17 and 18, whereby the projected fingers 14 move the bags a predetermined distance. Units 16 then remain stationary for an interval during which shaft 19 rotates in an opposite direction to retract all of the fingers 14. After such retraction the units 16 are returned to their initial positions together with the fingers 14. It will be evident that this cycle of operation provides for successive positions of rest for performing various operations upon the bags. One such position of rest occurs when a filled bag is moved into the bag sealing station, where it is operated upon by the present machine.

The upper forward end of the machine (Figure 1) is provided with a vertically movable head 21 serving to carry certain of the working parts. Member 22 forms a stationary guideway for head 21, and is carried by the vertically adjustable frame portion 20 of the machine. As drive means for reciprocating the head 21, I provide a shaft 23 which is operatively connected by miter gears 24 with the vertical shaft 26. As will be presently explained the shaft 26 is oscillated by means including a suitable cam. A crank arm 27 is fixed to the forward end of shaft 23, and carries a roller 28 (Figure 8) which is accommodated within the slot 29. This slot is formed in a block 31 which is attached to the rear side of the head 21.

Additional working parts of the machine are carried by the horizontal bar 33, which is likewise reciprocated. Bar 33 is suitably guided in the frame portion 20 of the machine, and is attached to operating means to effect its cyclic reciprocation. The operating means in this sense includes the bar 36 (Figures 2 and 7) which can be T-shaped in cross-section and which is mounted upon one side of the bar 33. Bar 36 forms an adjustable mounting for member 37 (Figures 2, 7 and 11). Member 37 is pivotally attached to the link 38, which in turn has its rear end connected to an arm 39. Arm 39 is mounted upon the upper end of the vertical drive shaft 41, the lower end of which is associated with operating means to be presently described.

Additional operating parts of the machine are carried by another reciprocating bar 42 (Figure 10). This bar is likewise slidably carried by the frame of the machine for reciprocation in a horizontal direction, and is attached to suitable operating means. Thus a bar 43 (Figures 2 and 7) which is also T-shaped is carried by one side of the bar 42, and serves to adjustably mount the member 44. A link 46 has one end pivotally attached to member 44, and its other end pivotally connected to the arm 47. This arm is carried by the upper end of drive shaft 48, the lower end of which is connected with drive means to be presently described. The pivotal connections between links 38 and 46 and crank arms 39 and 47 are adjustable, thereby enabling adjustments of the strokes of bars 33 and 42.

Shafts 26, 41 and 48 are arranged to extend parallel down the backside of the machine (Figure 2). Each of these shafts is driven by separate gear racks and cams. The main shaft 51 of the bag making and filling machine is preferably utilized to drive the various parts of the present sealing machine, particularly because this makes possible synchronization of the sealing machine with the bag making and filling functions. As shown in Figures 3, 4 and 5 the shaft 51 may be an extension of the main shaft of the bag making and filling machine, which turns continuously, and it is shown provided with three cams 52, 53 and 54. Cam 52 is provided with a cam groove 56 (Figure 5) within which the cam roller 57 operates. Roller 57 is carried by member 58, which is guided for horizontal movement and is attached to the gear rack 59. The lower end of shaft 41 is splined to a gear (not shown), which in turn is engaged by the teeth of rack 59. Cam 53 (Figure 4) is similarly provided with the cam groove 61 which accommodates the cam roller 62. This roller is carried by the horizontally movable member 63, which in turn is attached to the gear rack 64. The lower end of shaft 26 is splined in a pinion (not shown), which engages the teeth of gear rack 64.

Cam 54 has a contoured outer periphery 66, which engages the cam rollers 67. These rollers are carried by the horizontally movable and guided member 68, which in turn is attached to the gear rack 69 (Figure 3). The lower end of shaft 48 (Figure 3) is similarly splined at its lower end to a gear (not shown), which engages the teeth of rack 69.

With the motion applying mechanism described above, it is evident that for one revolution of shaft 51, the various shafts 41, 26 and 48 are oscillated, and those oscillating movements serve to reciprocate the vertically movable member 21, and the horizontally movable bars 33 and 42.

The parts carried by the vertically reciprocating member 21 include certain fingers which are adapted to perform operations upon the upper end of the bag. In the embodiment illustrated in Figures 9 and 10, these fingers include the two sets of members 73 and 74 which reciprocate vertically, and the members 76 which reciprocate vertically and also move horizontally. As will be presently explained, the number and arrangement of these fingers can be varied in different instances, depending upon the type of bag encountered, the type of material in the bag, and the manner in which one may desire to apply the closure and seal. The adjustable mounting means for the fingers 73 and 74 includes the spaced horizontal bars 77, which are attached to bracket 78. This bracket is carried in front of the machine and is attached to the movable head part 21. Two sets of blocks 79, 81 are adjustably carried by the bars 77, and form a rigid attachment for the upper ends of the fingers 73 and 74.

The movable fingers 76 are carried by the horizontal mounting bar 82 (Figure 9), which is likewise attached to the bracket 78 (Figure 10). Thus the upper ends of fingers 76 have pivotal connections 83 with blocks 84. These blocks are adjustably and removably carried by the bar 82. The fingers 76 are operated by rocker arms 86 which are likewise pivotally mounted upon the blocks 84. One end of each rocker arm 86 has a pin and slot connection 87, with an arm 88 formed on the associated fingers 76. The other end of each rocker arm 86 is provided with a projecting pin 89, which is adapted to be operated by means to be presently described. It will be evident that when the pins 89 are moved upwardly relative to the bar 82, the lower ends of the fingers 76 are swung inwardly from the positions illustrated in Figure 9. For their innermost limiting positions the lower ends of these fingers may be overlapping.

Located generally in front of the machine there is a depending rod 91, which is adjustably carried by the bracket 90. The abutment bars 92 and 93 are adjustably mounted upon rod 91, and one such bar (Figure 10) is arranged to engage the pins 89 when the member 21 and the parts carried by the same are moved upwardly. Arresting upward movement of the pins 89 in this manner while the bracket 78 continues to move upwardly serves to swing the fingers 73 outwardly to the position shown in Figure 9, as previously described. Suitable means such as friction washers serve to normally retain the fingers 76 against pivotal movement. When bracket 78 moves downwardly, pins 89 engage bar 93 to thereby swing the fingers 76 inwardly.

As illustrated in Figures 9 and 10 the movable fingers 76 are arranged to move between the spaced fingers 73, 74. It may be explained at this point that in normal operation the fingers 73, 74 are so mounted with respect to the size of the bag being handled, that when lowered they enter the upper end of the bag, while the fingers 76 move inwardly upon the side walls of the bag, from an outer position. Fingers 76 perform a general folding operation upon the material of the bag, while fingers 73, 74 hold the material of the bag while this folding operation proceeds.

The operating parts carried by the bar 33 include the pressure plate 96 (Figure 10). This plate is attached to the lower ends of rods 97, which in turn are slidably retained with the end portions 98 of the arm 99. Compression springs 101 urge the plate 96 downwardly, and permit yielding upward movement. Arm 99 is secured to the pivotal shaft 102, which in turn is carried by a bracket 103. Arm 99 is normally urged in a clockwise direction as shown in Figure 10, by means of a spring pressed pin or plunger 104, which engages a lug 106 extending from the arm 99. A cam bar 105 is also slidably mounted in the bracket 103, immediately below the bar 33. A cam surface 107 in the lower edge of bar 105 normally engages a pin 108 which is slidably carried by bracket 103. The lower end of pin 108 engages a set screw 109, which is carried by arm 99. Compression spring 111 normally urges the bar 105 to its left hand limiting position. However when bar 33 moves to the left as viewed in Figure 10, the left hand end of the cam bar 106 is brought into engagement with the adjustable abutment screw 112, thereby causing relative movement of the cam bar 105 to effect a counterclockwise turning of the arm 99, to bring the plate 96 into a substantially horizontal position.

The parts carried by the reciprocating bar 42 include the electrically heated pressing and sealing member 116. This member is carried by the lower ends of rods 117, which in turn are slidably carried by the arm 118. Compression springs 119 yieldably urge the member 116 downwardly. Arm 118 is carried by shaft 121 which is supported by the bracket 120 on bar 42, and which carries the pinion 122. This pinion engages a second pinion 123 which is carried by another shaft 124, whereby upon counterclockwise rotation of shaft 124 (Figure 10) the arm 118 is swung in a clockwise direction to lower the sealing member 116. An arm 126 is secured to shaft 124, and is disposed between two adjustable bolts 127, 128 which are adjustably accommodated by the slot 129 in plate 131. This plate in turn is attached to a stationary frame part of the machine. A tension spring 132 has its one end anchored to a fixed part of the machine, and its other end attached to the arm 133, which is also secured to the shaft 124. Thus the spring urges the shaft 124 to rotate in a clockwise direction, whereby the sealing member 116 normally remains in its raised position. When bar 42 moves forwardly in its reciprocating cycle, arm 126 is brought into engagement with the screw 128 to cause lever 126 to be rocked in a clockwise direction, thus swinging arm 118 in a clockwise direction to lower the sealing member 116 against the top of the bag.

Figures 12 to 20 inclusive of the drawing illustrate diagrammatically the various operations in folding the upper end of the bag, and in effecting a heat seal. Thus as illustrated in Figure 12 the bag 1 is shown in position for a folding and heat sealing operation with its upper end portion 1a extending a substantial distance above the level 2 of the bag contents. The contents may for example be food products such as dried beans and the like, or pieces of confection.

To commence a folding and sealing cycle the head of the machine starts downwardly, carrying with it the fingers 73, 74 and 76. Immediately prior to the descent of these fingers they occupy substantially the positions illustrated in Figures 12 and 12a. As the fingers move downwardly (Figure 13) the fingers 73, 74 commence to enter the upper end of the bag, and the fingers 76 swing inwardly. Shortly after the fingers 73, 74 complete their descent into the bag, the lower ends of fingers 76 swing inwardly to substantially the position illustrated in Figures 14, 14a and 15, to form in effect a pleat in the upper end of the bag. As illustrated in Figure 16 the presser plate 96 now moves inwardly over the upper part of the bag and as it progresses over the bag it folds the projecting upper portion substantially as shown in Figure 17. As the presser plate completes its movement over the upper end of the bag, it moves downwardly against the contents of the bag substantially as shown in Figure 18. During the movement illustrated in Figure 17 the fingers 73, 74 and 76 begin their upward movement as indicated and as this movement proceeds the fingers 76 are swung outwardly.

For the position of the parts illustrated in Figure 17, all of the fingers have completed their retraction from the bag. As the presser plate is being moved to the position shown in Figure 18, the heater 116 commences to move over the top of the bag as indicated in Figures 17 and 18. This serves to fold over the projecting portion of the bag preparatory to the heat sealing operation. When the heater has reached substantially the position shown in Figure 19, the presser plate 96 is being retracted as indicated in this figure. As the presser plate retracts from the upper end of the bag, the heater 116 is pressed down upon the top of the bag (Figure 20) and performs the heat sealing operation. Instead of this sequence the plate 96 can be adjusted to retract shortly after heater 116 has pressed down upon the plate, thereby causing the heater to first seal that part of the bag overlying the plate, and then establish a seal against the more irregular contents of the bag.

The completely sealed bag is illustrated in Figures 21 and 22. In this instance the bag made by the bag making unit was of the gusset type, and was filled with dried beans. Note that the upper end portion 1a of the bag has been doubled over and heat sealed to form the upper end of the bag. The closure is a relatively tight one in that there is no undue looseness of the contents of the bag. There are no objectionable projecting tabs, and in general the closure affords sufficient strength to withstand ordinary packaging, handling and marketing.

The machine described above makes use of two sets 73, 74 of stationary fingers for aiding in the folding operation. It has been found that the machine will work satisfactorily if one of these sets of fingers, particularly set 74, is omitted. Without the fingers 74 the machine operates in a manner quite similar to that described with reference to Figures 12 to 20 inclusive, except that on the forward side of the movable fingers 76 (see Figure 14) there is a more general gathering of the bag material.

Figures 23 to 25 inclusive illustrate a modification of the machine in which a roller is utilized to draw the material more tightly about the contents of the bag, and in which the heater is operated in a different manner. The presser plate 96 in this instance is also mounted in a different manner, although its function is similar to the first described embodiment.

Referring particularly to Figures 23 and 24, the reciprocating horizontal bar 33 serves to mount the bracket 130, which in turn forms a journal for the horizontal pivotal shaft 134. An arm 135 has lugs 136 which are attached to the shaft 134. The side extremities of arm 135 carry bosses within which the pins 137 are slidably retained. The lower ends of these pins are attached to the presser plate 96. Compression springs 138 urge the plate 96 downwardly with respect to the arm 135. The forward intermediate portion of arm 135 is provided with a lug 139, which engages the spring pressed plunger 141. Plunger 141 retains the arm 135 in the elevated or raised position shown in Figure 23. An arm 142 is attached to shaft 134, and carries the cam roller 143. Roller 143 is adapted to engage the lower cam surface of cam block 144, which in turn is adjustably carried by the stationary bar 146.

The heater 147 (Figures 23, 24) is carried by the pins 148, which in turn are slidably retained by the arm 149. This arm is mounted upon a horizontal shaft 151, which in turn is carried by the support mounting or bracket 152. The pinion 156 carried by shaft 151 engages a pinion 157 which is attached to the operating arm 158. The shaft for pinion 156 carries a pin or arm 159, which in turn is attached to the tension spring 161. Thus the operating arm 158 is normally urged toward its upright position shown in Figure 23, and when this arm is swung in a counterclockwise direction, the heater 147 is swung downwardly. An adjustable abutment pin 162 is mounted upon a stationary frame part of the machine, and this pin is engaged by arm 158 when bar 42 moves forwardly, thus causing a counterclockwise swinging movement of the arm 158, for the final forward movement of the bar 42, and the heater 147.

Mounted slightly in advance of the heater 147, there is a presser roller 166. This roller is journaled upon the rod 167, and this rod has its ends attached to the arms 168, 169. The rear extremities of these arms are journaled to the extended end portions of the shaft 151. Arm 169 has a rear extension 170, which serves to engage the adjustable stop 171. The forward end of arm 169 is shown provided with an upwardly and forwardly extending finger 172, to make certain that the roller 166 always passes over the presser plate 96.

In the machine of Figures 23 and 24, it is presumed that two sets 73, 74 of stationary fingers are employed, and one set of movable fingers 76. In place of utilizing linear edges for the fingers 73, 74 it is desirable to utilize a concave contouring as indicated at 176 in Figure 25. As will be presently explained this concave contouring tends to cause a better creasing action at the time the fingers are retracted from the bag.

Figures 30 to 34 inclusive serve to illustrate the various operations involved during folding and heat sealing a bag by the use of the machine described with reference to Figures 23 to 25 inclusive. The fingers 73, 74 and 76 enter the bag and operate upon the upper end of the bag in the same manner as the first described embodiment. Presser plate 96 moves over the upper part of the bag in the same manner as previously described, and about the time this presser plate reaches its final position (Figure 32) the roller 166 moves forwardly upon the bag. The roller rides over the top of the contents of the bag, and its action tends to tighten the bag about the contents, and at the same time forms a desired fold-over operation. Figure 33 illustrates the position of the roller 166 in which it overrides the presser plate 96. About that time the presser plate retracts to its initial position, and eventually the roller reaches its extreme position shown in Figure 34. By that time the heater has been swung down against the top of the bag for the heat sealing operation.

Retraction of the fingers from the upper portion of the bag is illustrated in Figure 32. During this retraction there is a creasing operation, which is due to pulling the material of the bag over the concave contoured edges 176. Such creasing aids in producing a neat folded top for the bag.

In certain instances it is desirable to produce a flat crimp seal for the top of the bag, in place of a folded over and sealed end. Figures 26 and 27 illustrate a modification of the machine which will produce a crimp seal with a gusset type of bag. In this instance a pair of electrically heated bar-like heaters 175, 177 are employed. Heater 175 is carried by the bracket 178, which is mounted upon the reciprocating bar 42. Pins 179 are slidably carried by the bracket 178, and carry the bar-like heater 175 at their forward ends. Compression springs 181 yieldably urge the heater 175 forwardly.

Heater 177 is carried by bracket 182, which in turn is mounted upon the reciprocative bar 33. Pins 183 are slidable within the bracket 182, and are attached to the heater 177 at their forward ends. Compression springs 184 urge the heater 177 rearwardly.

Extending below the heater 175 there is a plate 186, which is carried by the bracket 178. Below the heater 177 there is a pusher bar 187, which is carried by the slidably mounted pins 188. Compression springs 189 urge the bar 187 forwardly, and this bar is preferably provided with a facing 191 of soft compressible material like sponge rubber.

The modification of my invention illustrated in Figures 26 and 27 operates in the manner illustrated in Figures 35 to 37 inclusive. Thus it is assumed that the bag is of the pleated or gusset type, and that it has been filled in such a manner as to permit a so-called flat crimp seal. When the filled bag 3 arrives at the sealing station it appears substantially as shown in Figure 35. The fingers 73, 74 and 76 move down upon the top 3a of the bag, with the fingers 76 swinging inwardly after the fingers 73 and 74 have entered the bag. After these fingers have performed their folding operation, they commence to move upwardly out of the bag and at the same time the heaters 175, 177 move inwardly, as shown in Figure 36. When heaters 175, 177 move inwardly for the heat sealing operation, plate 186 and the bar 187 engage the sides of the bag below the heaters for the purpose of collapsing this portion of the bag to expel air. Finally the heaters 175, 177 reach the heat sealing position shown in Figure 37, in which they directly press upon opposite sides of the extended flat end 3a of the bag. This serves to form a crimped effect seal 4, as shown in Figure 8. The crimping effect as shown by this seal can be enhanced by providing the faces of the heaters with suitable grooves. After the heat sealing operation indicated in Figure 37, the heaters 175, 177 immediately retract and the bag is released for the next cycle of operation.

In some instances it is desirable to use a plain or flat bag, which is not provided with side pleats or gussets. Figures 28 and 29 show a suitable modification of the machine for this purpose. The stationary sets of fingers 73, 74 have been removed. Instead of the pins 89 being mounted upon the fulcrumed arms 86, similar pins 196 are mounted upon the opposite ends of the arms 86. Thus when the pins 196 engage the bar 92, the fingers 76 are swung inwardly, and when they engage the lower bar 93, the fingers 76 are swung outwardly.

Operation of the embodiment illustrated in Figures 28 and 29 can be understood by reference to Figures 39 and 40. Figure 39 illustrates the relationship of the bag with the fingers 76, immediately prior to lowering of the fingers into the bag. This is likewise illustrated in solid lines in Figure 40. Fingers 76 are lowered into the upper open end of the bag, and then they are swung outwardly to the positions illustrated in dotted lines in Figure 40, to spread the upper end of the bag. About the time the upper end of the bag is spread in this fashion, the heaters 175, 177 move inwardly upon opposite sides of the flattened end of the bag, and immediately prior to engagement of these fingers with the collapsed end of the bag, the fingers 76 are retracted. Thereafter the heaters engage the collapsed end of the bag for the heat sealing operation. In this embodiment the plate 186, and also the bar 187, aid in collapsing the end of the bag and in expelling the air from the same prior to the heat sealing operation.

I claim:

1. In a bag closing and sealing machine, means for supporting a filled bag, means including fingers for positioning and retaining the upper projecting end portion of the bag, a heater, means for translating the heater into operative engagement with the projecting end portion of the bag to form a heat seal, and presser means cooperating with the heater to effect folding of the projecting end portion of the bag and for pressing down upon the contents of the bag prior to a heat sealing operation and means for activating the presser means in cyclic relation to movements of the heater to cause the presser means to retract as the heater is applied.

2. In a bag closing and sealing machine, means for supporting a filled bag for a closing and sealing operation, means including fingers for positioning and retaining the upper projecting end portion of the bag, said fingers including one pair movable vertically into the interior of the bag and a second pair movable from the exterior of the bag to gather the upper end portion of the bag about said first named fingers, a heater, a presser plate, means for cyclically translating the presser plate over the upper end of the bag and downwardly into pressing engagement with the contents of the bag, and means for cyclically translating the heater into a position overlying the bag and then downwardly against the upper end of the bag to perform a heat sealing operation, the means for cyclically translating the presser plate serving to retract the presser plate as the heater is applied.

3. In a bag closing and sealing machine, means for supporting a filled bag for a closing and sealing operation, means including fingers for positioning and retaining the upper projecting end portion of the bag, a heater, a presser plate, a presser roller, means for cyclically translating the presser plate over the upper end of the bag and downwardly into pressing engagement with the contents of the bag, means for cyclically translating the roller across the upper end of the bag to fold the projecting end of the bag over the presser plate, and means for cyclically translating the heater into a position overlying the bag and then downwardly against the upper folded end of the bag to perform a heat sealing operation.

4. In a bag closing and sealing machine, means for supporting a filled bag for a closing and sealing operation, means for positioning and retaining the upper projecting end portion of the bag, a heater, a presser plate, a presser roller, means for cyclically translating the presser plate over the upper end of the bag and into engagement with the contents of the bag, means for cyclically translating the roller across the upper end of the bag to fold the projecting end of the bag over the presser plate, means serving to carry the roller to permit limited vertical movement of the same, thereby enabling the roller to roll over the contents of the bag during its cyclic movement, and means for cyclically translating the heater into a position overlying the bag and then downwardly against the upper folded end of the bag to perform a heat sealing operation.

5. In a bag closing and sealing machine, means for supporting a filled bag for a closing and sealing operation, means for positioning and generally flattening the upper projecting end portion of the bag, a heater, a presser member, means for cyclically translating the presser member over the upper end of the bag and downwardly into pressing engagement with the contents of the bag, and means for cyclically translating the heater into a position overlying the bag and then downwardly against the upper end of the bag to perform a heat sealing operation, said means for cyclically translating the presser member serving to retract the same as the heater is applied.

6. In a bag closing and sealing machine, means for supporting a filled bag for a closing and sealing operation, means for positioning and retaining the upper projecting end portion of the bag, a heater, a presser plate, another presser member, means for cyclically translating the presser plate over the upper end of the bag and downwardly into pressing engagement with the contents of the bag, means for cyclically translating the other presser member across the upper end of the bag while in downwardly pressing engagement with the same to fold the projecting end of the bag over the presser plate, and means for cyclically translating the heater into a position overlying the bag and then downwardly against the upper folded end of the bag to perform a heat sealing operation, the means for translating the presser plate and the means for translating the presser member serving to retract the plate as said member is translated across the bag and to complete movement of the member across the bag as said heater is applied.

7. A machine as in claim 6 in which said presser member is a roller adapted to roll across the upper end of the bag.

RENE J. GAUBERT.

REFERENCES CITED

The following references are of record in the file of this patent:

UNITED STATES PATENTS

| Number | Name | Date |
|---|---|---|
| 1,398,840 | Conley | Nov. 29, 1921 |
| 1,851,676 | Litchfield | Mar. 29, 1932 |
| 1,979,496 | Schlibach | Nov. 6, 1934 |
| 1,984,850 | Van Buren | Dec. 18, 1934 |
| 2,243,805 | Knapp | May 27, 1941 |
| 2,327,267 | Howard | Aug. 17, 1943 |